US009432791B2

(12) United States Patent
Chatterjee (10) Patent No.: US 9,432,791 B2
(45) Date of Patent: Aug. 30, 2016

(54) LOCATION AWARE SELF-CONFIGURING LOUDSPEAKER (71) Applicant: HARMAN INTERNATIONAL INDUSTRIES, INC., Stamford, CT (US)

(72) Inventor: Dibyendu Chatterjee, Bengaluru (IN)

(73) Assignee: HARMAN INTERNATIONAL INDUSTRIES, INC., Stamford, Inc.

( * ) Notice: Subject to any disclaimer, the term of this patent is extended or adjusted under 35 U.S.C. 154(b) by 29 days.

(21) Appl. No.: 14/103,441

(22) Filed: Dec. 11, 2013

(65) Prior Publication Data

US 2015/0163616 A1  Jun. 11, 2015

(51) Int. Cl.
*H04R 5/02* (2006.01)
*H04S 7/00* (2006.01)
*G01S 5/22* (2006.01)

(52) U.S. Cl.
CPC ............... *H04S 7/301* (2013.01); *G01S 5/22* (2013.01); *H04R 5/02* (2013.01); *H04R 2205/024* (2013.01); *H04R 2420/07* (2013.01)

(58) Field of Classification Search
CPC .............................. H04R 5/02; H04S 7/301
USPC ........................................................ 381/303
See application file for complete search history.

(56) References Cited

U.S. PATENT DOCUMENTS

| 6,052,336 A * | 4/2000 | Lowrey, III ................ 367/139 |
| 2003/0119523 A1* | 6/2003 | Bulthuis ................ H04S 7/301 455/456.1 |
| 2005/0129254 A1* | 6/2005 | Connor ................ H04R 1/403 381/77 |
| 2006/0013070 A1 | 1/2006 | Holm et al. |
| 2012/0114151 A1 | 5/2012 | Nguyen et al. |
| 2013/0324031 A1 | 12/2013 | Loureiro |

OTHER PUBLICATIONS

Extended European Search Report for Application No. 14196443.7 dated May 4, 2015.

* cited by examiner

*Primary Examiner* — Simon King
(74) *Attorney, Agent, or Firm* — Artegis Law Group, LLP (57) ABSTRACT

A location aware self-configuring loudspeaker includes a plurality of ultrasonic receivers that each provide an associated received ultrasonic receiver signal. An RF receiver receives adjacent loudspeaker RF data from an adjacent location aware self-configuring loudspeaker and provides received RF data indicative thereof. A data receiver receives audio data and provides received audio data indicative thereof. The location aware self-configuring loudspeaker also includes a processor that receives and processes the received ultrasonic receiver signals and the received RF data to determine a location of detected adjacent loudspeakers and the location of the location aware self-configuring loudspeaker. The processor also provides data indicative of the determined location of the detected adjacent loudspeakers and the location of the self-configuring loudspeaker. In addition the processor receives and processes the received audio data based upon the determined location of the loudspeaker and radiates audio indicative thereof.

23 Claims, 6 Drawing Sheets

$$x_{2B} = \frac{b^2 - c^2 + d^2}{2d}$$

$$y_{2B} = \frac{b^2 - a^2 + d^2}{2d}$$

LOCATION AWARE SELF-CONFIGURING LOUDSPEAKER

FIELD OF TECHNOLOGY

The present disclosure relates to the field of loudspeakers, and in particular to a self-configuring location aware loudspeaker.

RELATED ART

The popularity of wireless speakers for playback of streaming audio from a portable device (e.g., the Apple iPhone® and iPad®, Samsung Galaxy®, etc.) continues to increase. For example, a wireless connection can be established between one or more wireless speakers and a Bluetooth™ equipped device (e.g., an Apple, Android® or Blackberry® device). As known, Bluetooth™ is a wireless technology standard for exchanging data over short distances (using short-wavelength radio transmission in the ISM band from 2400-2480 MHz) from fixed and mobile devices.

When a source streams audio to several wireless speakers capable of forming a multichannel audio system, the speakers do not know their role in the multichannel audio system. For example, without apriori knowledge of its defined role in the multichannel system based upon a manual input, each wireless speaker will not know for example whether it should be a front-left, center, front-right, rear-left or rear-right speaker, thus not allowing the user to take advantage of the numerous speakers available to reproduce multichannel audio.

There is a need for a self-configuring location aware loudspeaker capable of automatically determining its relative position in a constellation of other self-configuring location aware loudspeakers.

SUMMARY OF THE INVENTION

A location aware self-configuring loudspeaker includes a first ultrasonic receiver, a second ultrasonic receiver and a third ultrasonic receiver that provide first, second and third received ultrasonic receiver signals. An ultrasonic transmitter transmits an ultrasonic signal associated with the loudspeaker, and an RF transmitter that transmits an RF signal associated with the loudspeaker. An RF receiver receives adjacent loudspeaker RF data from an adjacent location aware self-configuring loudspeaker and provides received RF data indicative thereof. A data receiver receives audio data and provides received audio data indicative thereof. The location aware self-configuring loudspeaker also includes a processor that receives and processes the first, second and third received ultrasonic receiver signals and the received RF data to determine a location of detected adjacent loudspeakers and the location aware self-configuring loudspeaker. The processor also provides speaker constellation map data indicative of the determined location of the detected adjacent loudspeakers and the location of the self-configuring loudspeaker. In addition the processor receives and processes the received audio data and provides a processed received audio signal indicative of presence and the location of the location self-configuring loudspeaker relative to detected adjacent loudspeakers. The location aware self-configuring loudspeaker further comprises a memory device that includes data indicative of a speaker constellation map and communicates with the processor, and a transducer that radiates an audio signal indicative of the processed received audio data signal.

The transmitted RF signal may include data indicative of a frequency value of the ultrasonic signal, and relative location of the detected adjacent loudspeaker associated with the ultrasonic signal.

The processor may process at least one of the first, second and third received ultrasonic receiver signals to determine if the loudspeaker is located inside a room or outdoors. The processor may process the received audio data based upon whether the loudspeaker in within a room or not, and provide the processed received audio signal based upon the dynamics of the listening environment.

The ultrasonic transmitter may transmit the ultrasonic signal associated with the location aware self-configuring loudspeaker in time synchronization with the RF transmitter transmitting the RF signal from the loudspeaker.

The processor may include a time difference of arrival processing unit that processes the first, second and third received ultrasonic receiver signals.

The processor may determine which channel of multi-channel audio associated with the received audio data the loudspeaker should play based upon the determined location of the location aware self-configuring loudspeaker.

The wireless data receiver may comprise, for example, at least one of a Bluetooth receiver, a Near Field Communication (NFC) receiver or a WIFI receiver. The wireless data receiver may comprise a receiver configured and arranged to receive a carrier signal in the Industrial, Scientific and Medical (ISM) frequency range of about 2.4 GHz to 2.4835 GHz.

A method performed in a processor of a self-configuring loudspeaker of determining presence and location of adjacent loudspeakers includes receiving first, second and third received ultrasonic receiver signals associated with a first ultrasonic receiver, a second ultrasonic receiver and a third ultrasonic receiver respectively. The method transmits an ultrasonic signal having an ID tone associated with the self-configuring loudspeaker, and transmits an RF signal that includes first data indicative of the ID tone and second data indicative of the relative position of the self-configuring loudspeaker with respect to detected loudspeakers in a loudspeaker constellation space. The signal may also include third data indicative of locations of other detected loudspeakers. The method includes receiving an RF data signal and providing received RF data indicative thereof, and also receiving audio data and providing received audio data indicative thereof. The method further comprises processing the first, second and third received ultrasonic receiver signals and the received RF data to determine a location of a detected adjacent loudspeaker and providing speaker constellation map data indicative of the self-configuring loudspeaker, and processing the received audio data and providing a processed received audio signal indicative of presence and the location of detected adjacent loudspeakers relative to the loudspeaker. The method radiates an audio signal indicative of the processed received audio data signal.

Processing the first, second and third received ultrasonic receiver signals and the received RF data may include time difference of arrival (TDOA) processing of the first, second and third received ultrasonic receiver signals and the received RF data to determine a relative location of the self-configuring loudspeaker with respect to the location of the detected adjacent loudspeaker.

It is to be understood that the features mentioned above and those to be explained below can be used not only in the respective combinations indicated, but also in other combinations or in isolation.

These and other objects, features and advantages of the invention will become apparent in light of the detailed description of embodiments thereof, as illustrated in the accompanying drawings. In the figures, like reference numerals designate corresponding parts.

DESCRIPTION OF THE DRAWINGS

The foregoing and other features of embodiments will become more apparent from the following detailed description of embodiments when read in conjunction with the accompanying drawings. In the drawings, like or identical reference numerals refer to like or identical elements.

DETAILED DESCRIPTION OF THE INVENTION

Figure 1:
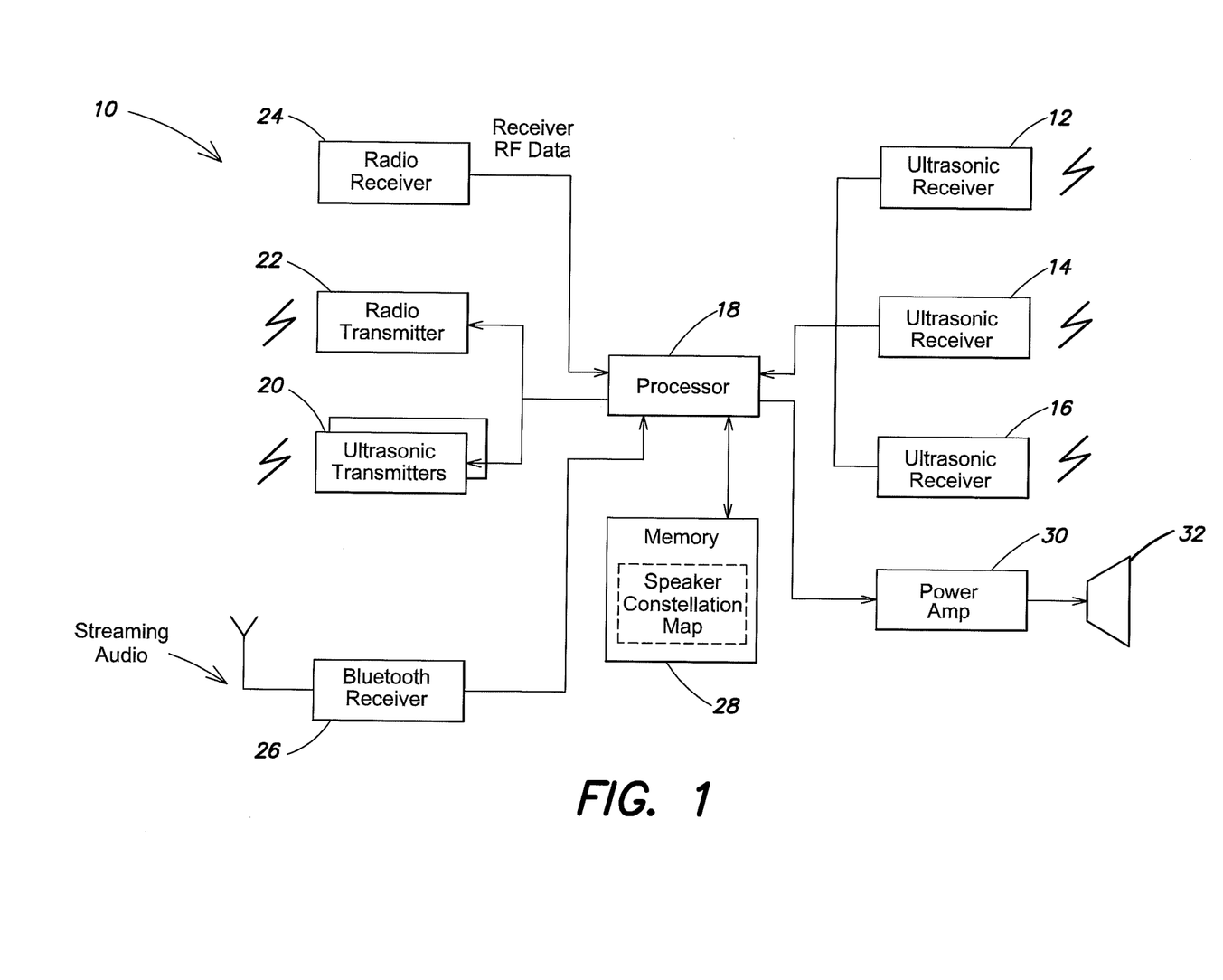
FIG. 1 is a block diagram illustration of a self-configuring location aware loudspeaker.

FIG. 1 is a block diagram illustration of a self-configuring location aware loudspeaker 10. The speaker 10 includes a first ultrasonic receiver 12, a second ultrasonic receiver 14 and a third ultrasonic receiver 16 that provide first, second and third received ultrasonic receiver signals, respectively, to a processor 18. The speaker 10 also includes an ultrasonic transmitter 20 that transmits an ultrasonic signal associated with the loudspeaker, an RF transmitter 22 that transmits an RF signal, and an RF receiver 24 that receives adjacent loudspeaker RF data from one or more adjacent self-configuring location aware loudspeakers. The processor 18 processes the adjacent loudspeaker RF data indicative of the presence and the location of the adjacent location self-configuring loudspeaker. The loudspeaker 10 also includes a wireless data receiver 26 (e.g., a Bluetooth™ receiver) that receives audio data and provides received audio data indicative thereof to the processor 18. The loudspeaker 10 may also include a wireline connector (e.g., a micro-USB port or a 3.5 mm auxiliary input) to establish a wireline connection to receive an audio signal from the source (not shown).

The processor 18 receives and processes the first, second and third received ultrasonic receiver signals from the first, second and third ultrasonic receivers 12, 14, 16, respectively. The loudspeaker 10 also includes memory 28 accessible to the processor 18, and the memory 28 includes a speaker constellation map 30 indicative of the determined location of the detected adjacent loudspeakers and the location of the self-configuring loudspeaker 10 itself. The details of this processing to determine the location of the detected adjacent loudspeakers and the location of the self-configuring loudspeaker 10 itself shall be discussed hereinafter.

Referring still to FIG. 1, the processor 18 receives and processes the received audio data from the radio receiver 24 and provides a processed received audio signal indicative of the presence and the location of the location self-configuring loudspeaker relative to detected adjacent loudspeakers. A power amplifier 30 receives a processed audio data signal from the processor and provides an amplified signal to an audio transducer 32, which radiates audio indicative thereof.

Figure 2:
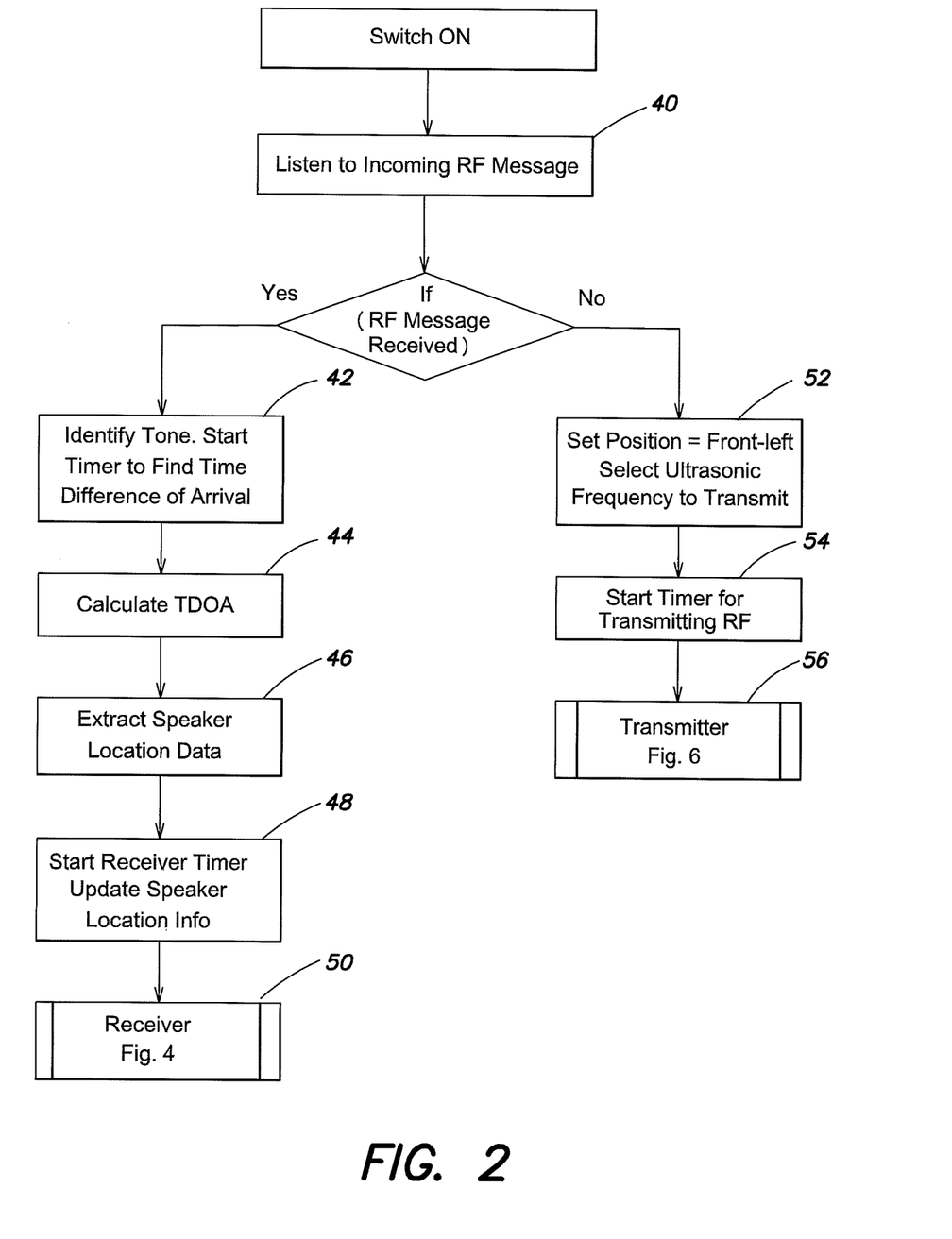
FIG. 2 is a flow chart illustration of steps performed by the processor when the loudspeaker illustrated in FIG. 1 is turned on or reset.

FIG. 2 is a flow chart illustration of steps performed by the processor 18 (FIG. 1) for example, when the loudspeaker 10 (FIG. 1) is turned on, or reset or on a periodic basis. In step 40 the loudspeaker 10 listens for any incoming radio signal received by the radio receiver 24 (FIG. 1). If an incoming radio message is received, step 42 is performed to determine a tone frequency value identified in a data field of the incoming radio message and start a timer associated with that particular received tone. Each of the adjacent self-configuring location aware loudspeakers have a unique tone associated with its ultrasonic signal and identified in the transmitted RF signal so adjacent location aware loudspeakers can uniquely identify each loudspeaker available to make up the loudspeaker constellation.

Once the timer is started, step 44 is performed to calculate a time difference of arrival (TDOA) of an ultrasonic signal associated with the adjacent location aware loudspeaker that transmitted the particular incoming radio signal identifying the detected tone. In this step the elapsed time is determined that each of the first, second and third ultrasonic receivers 12, 14 and 16, respectively, receive the ultrasonic signal associated with the detected tone since the start of the timer. The arrival time at the three ultrasonic receivers can be used to determine the location of the loudspeaker that transmitted the ultrasonic signal, along with the time differences between receiving the ultrasonic signal and the incoming radio signal. Since adjacent loudspeakers will be configured and arranged similar to FIG. 1 in order to transmit both an RF signal and an ultrasonic signal associated with the transmitting loudspeaker, the RF signal will be received first given the speed of the RF signal versus the ultrasonic signal (i.e., the speed of light versus the speed of sound).

Figure 3:
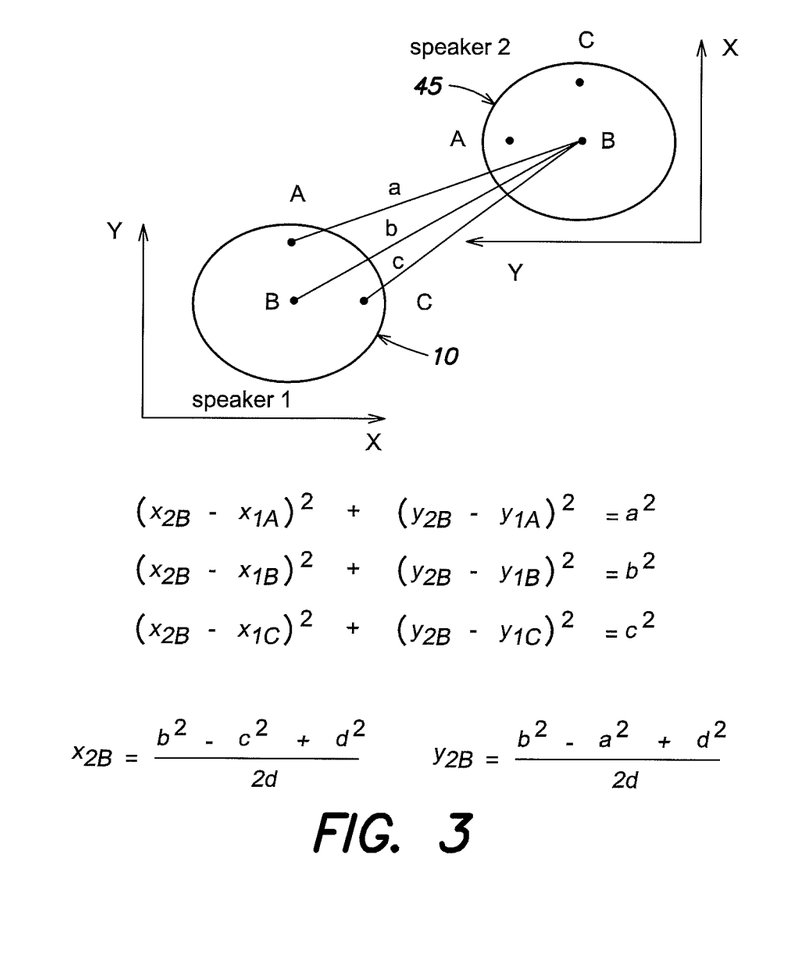
FIG. 3 is a graphical illustration of ultrasonic trilateration.

FIG. 3 is graphical illustration of ultrasonic trilateration. In this illustration the loudspeaker 10 (FIG. 1) is illustrated relative to the position of adjacent location aware loudspeaker 45. In this illustration the adjacent location aware loudspeaker 45 transmits its ultrasonic signal from position 2B, and the location of the first, second and third ultrasonic receivers 12, 14, 16 of the loudspeaker 10 are also illustrated. In addition, lines a, b, c are illustrated between the ultrasonic transmitter of the adjacent loudspeaker 45 and the first, second and third ultrasonic receivers 12, 14, 16, respectively of the loudspeaker 10. The first, second and third ultrasonic receivers 12, 14, 16 may be arranged on the loudspeaker in an array, or for example may each be located on different exterior surfaces of the loudspeaker.

Referring to FIGS. 1 and 3, the processor 18 (FIG. 1) determines the time difference of arrival (TDOA) of the RF signal at the radio receiver 24 and ultrasonic sonic signals at each of the first, second and third ultrasonic receivers, 12, 14 and 16, respectively. TDOA processing is known and shall not be discussed in detail herein in the interest of brevity. However, as shown in FIG. 3, TDOA processing with respect to the RF signal will give three circles with centers at the position of the three ultrasonic receivers on the speaker body. With the assumption that the speakers are in a plane, the position of the origin of the ultrasonic sound can be identified by calculating the point of intersection of the three circles.

Referring again to FIG. 2, once the TDOA data is calculated in the step 44, the speaker location data received with the incoming radio signal is determined in step 46. This data is indicative of determined relative loudspeaker locations within the constellation. In step 48 a second timer is started and the speaker constellation map data stored in the memory 28 is updated based upon the received speaker location data and the data from the TDOA calculations. The processing then proceeds in step 50 to a receiver routine to be discussed in detail hereinafter.

If an incoming RF message is not received in step 40, then step 52 is performed to set the position to a datum (e.g., front-left). The receipt of no incoming radio message indicates that there are no adjacent self-configuring location aware loudspeakers. So if the loudspeaker 10 fails to receive an incoming radio message within a certain amount of time (e.g., 10 seconds), then the loudspeaker 10 is the only speaker in the constellation, and thus assigns itself the datum position of front-left in the speaker constellation. The threshold time value may be set based upon factor such as size of the room, number of speakers and the frequencies they will be transmitting. Of course, it is contemplated that the initial datum position may be assigned as any other position in a loudspeaker constellation, such as for example, front-right, center, rear-left, rear-right, et cetera.

In step 52 an ultrasonic frequency for transmission from the loudspeaker 10 is selected. This selection may be performed by randomly selecting from a plurality of candidate frequency values large enough to statistically mitigate the chance of two adjacent loudspeakers using the same ultrasonic frequency. Since a condition precedent to performing the step 52 is that no radio message has been received, using this random selection process is preferred since there are no other adjacent loudspeakers. Step 54 is then perform tied to start a third timer associated with transmission of the RF message to the transmitted by the loudspeaker 10. The processing then proceeds in step 56 to a transmitter routine to be discussed in detail hereinafter.

Figure 4:
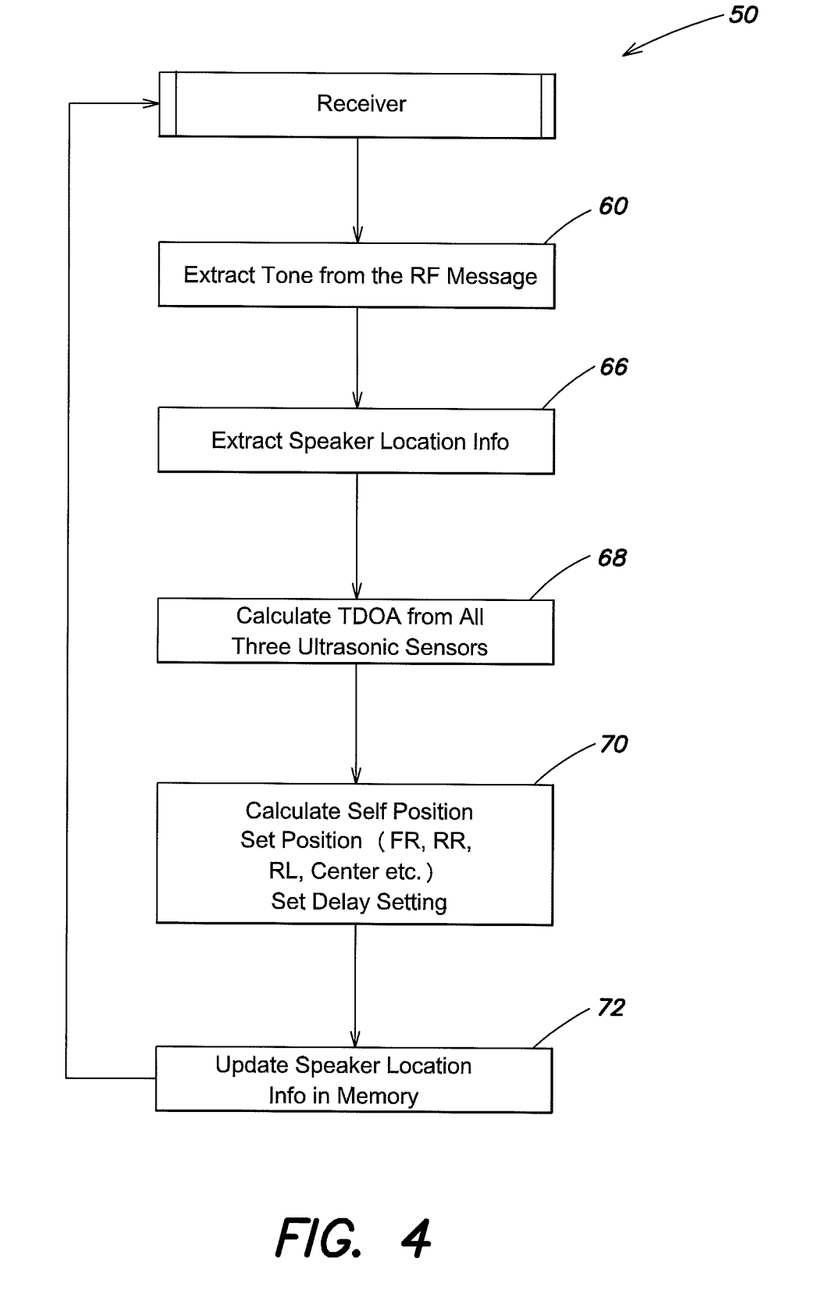
FIG. 4 is a flow chart illustration of a receiver routine associated with the processing illustrated in FIG. 2.
Figure 5:
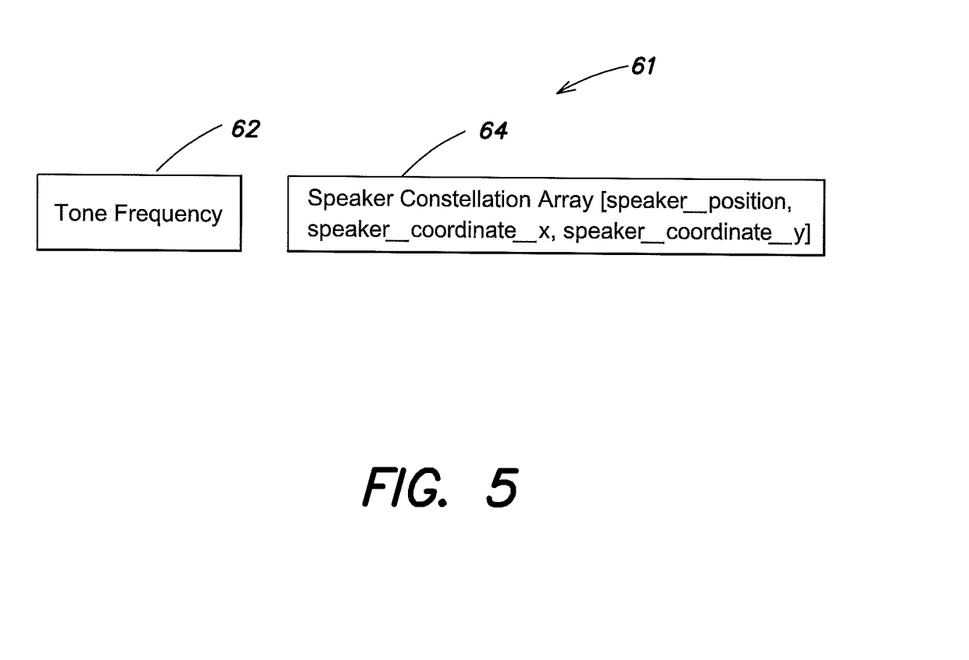
FIG. 5 illustrates a pictorial illustration of data content of the received radio message.

FIG. 4 illustrates details of the receiver routine 50 (FIG. 2). In FIG. 4 step 60 is performed to extract ultrasonic tone data from a received RF message. FIG. 5 illustrates a pictorial illustration of data content of a received RF message 61. The received RF message may include a tone frequency data field 62 and a speaker constellation data field 64 that contains location information indicative of the location of the speaker associated with the tone identified in the tone frequency data field 62.

Step 60 of FIG. 4 may read the tone data from the tone frequency field 62 of the received radio message 61 illustrated in FIG. 5. Referring still to FIG. 4, next step 66 is performed to read the speaker constellation data field 64 illustrated in FIG. 5. This data includes data indicative of the location of the speaker associated with the tone identified in the tone frequency field 62. In step 68 the time difference of arrival of the signals at the first, second and third receivers 12, 14 and 16 is determined, based upon the elapsed time since the timer has been started in the step 42 (FIG. 2). Based upon the calculated time difference of arrival information, in step 70 the loudspeaker 10 (FIG. 1) can determine its location relative to the transmitting loudspeaker and the speaker constellation array data 64 (FIG. 5) in the received radio message 61. Referring still to FIG. 4, once the location of the loudspeaker 10 is determined in the constellation, the processor 18 (FIG. 1) may then calculate for example a delay and/or volume (e.g., DVC) setting for the loudspeaker. Delay and/or volume settings for loudspeakers based upon the position of the speaker in the multi-channel speaker constellation are known and shall not be discussed herein in the interest of brevity. Once the location of the loudspeaker is determined in step 70, step 72 is then performed to store the determined position in the speaker constellation map located in the memory 28 (FIG. 1). The location processing then awaits arrival of the next RF message.

Figure 6:
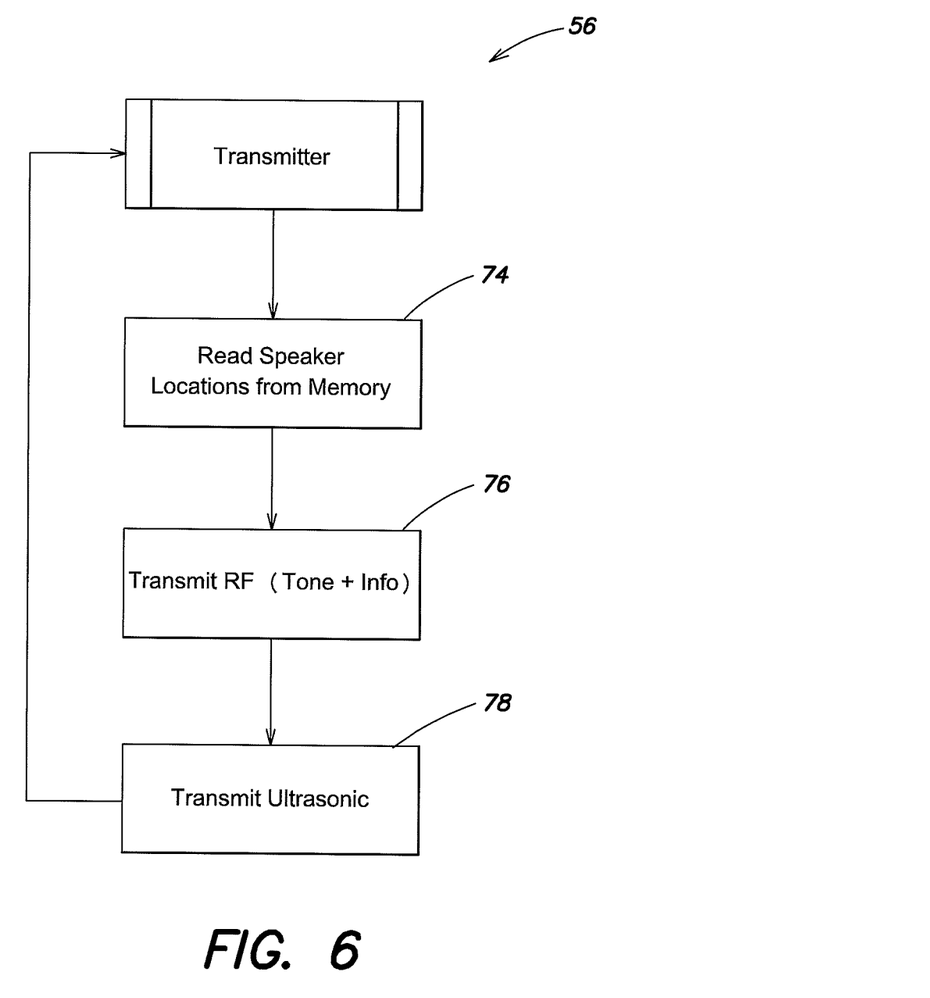
FIG. 6 is a flow chart illustration of a transmitter routine associated with the processing illustrated in FIG. 2.

Details of the transmitter routine 56 illustrated in FIG. 2 are set forth in FIG. 6. Referring to FIG. 6, the transmitter routine 56 is associated with processing to prepare a radio message as illustrated in FIG. 5 for transmission. In step 74 the processor reads the constellation speaker map data stored in the memory 28. This data is placed into a data message along with the information about the particular ultrasonic tone that the loudspeaker is transmitting for location determination, and the message is transmitted in step 76 via the radio transmitter 22 (FIG. 1). This message is broadcast to adjacent location aware self-configuring speakers to report the location of the loudspeaker 10. Step 78 is then performed for the ultrasonic transmitter 20 (FIG. 1) to transmit the tone to adjacent location aware self-configuring speakers for TDOA analysis.

The radio transmitter 20 and the radio receiver 22 may be configured and arranged to work with the ISM radio band. Alternatively, for example, the radio transmitter 20 and the radio receiver 22 may also be configured and arranged to establish a ZIGBEE™ network, based on the IEEE 802.15 standard. It is contemplated that any other low power communication protocol may also be used to establish a wireless communication link between adjacent location aware self-configuring loudspeakers.

It is contemplated that techniques other than ultrasonic trilateration may be used for a self-configuring loudspeaker to determine its location. For example, it is contemplated that WIFI fingerprinting/position determination technique may also be used. Various techniques for determining position are known, for example from the 2010 Indoor Positioning and Indoor Navigation (IPIN) Conference. See http://ipin-conference.org/.

The self-configuring location aware loudspeaker may also be configured to adjust the dynamics of the audio output from the audio transducer 32 (FIG. 1) based upon the detected location. For example, one of more of the received signals from the first, second and third ultrasonic receivers 12, 14 and 16 (FIG. 1) may be processed to determine if the loudspeaker is located inside a room, or located outside. Based upon the detected location of the loudspeaker, the dynamics of the processed audio data signal from the processing unit 18 (FIG. 1) may be adjusted by the processor for the desired dynamics of the listening environment.

The speakers in the constellation are preferably regularly emitting the RF and ultrasonic beacon/tone for the other speaker in the locality to determine its location and presence, it also helps in refreshing the location data in the memory for any change. Every beacon will have a life time attached to it, after which the position of the speaker will not be treated a valid. Once the speaker is out of the constellation it is no longer able to send the beacon, after a certain period when the other speakers stop receiving the beacon the position occupied by that speaker will be cleared in the memory.

A software implementation of the above-described embodiment may comprise a series of computer instructions either fixed on a tangible medium, such as a computer readable media, for example, a diskette, a CD-ROM, a ROM, or a fixed disk, or transmittable to a computer system via a modem or other interface device over a transmission path and stored on the system. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable medium with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although the invention has been illustrated and described with respect to several preferred embodiments thereof, various changes, omissions and additions to the form and detail thereof, may be made therein, without departing from the spirit and scope of the invention.

What is claimed is:

1. A location aware self-configuring loudspeaker, comprising:
   a plurality of ultrasonic receivers that each provide an associated ultrasonic receiver signal;
   an RF receiver that receives adjacent loudspeaker RF data and provides received RF data indicative thereof;
   a data receiver that receives audio data and provides received audio data indicative thereof;
   a processor that receives and processes the plurality of ultrasonic receiver signals and the received RF data to determine a location of the location aware self-configuring loudspeaker, and processes the received audio data and provides a processed received audio signal; and
   a transducer that radiates an audio signal indicative of the processed received audio data signal.

2. The loudspeaker of claim 1, wherein the processor processes the received ultrasonic signals and the received RF data to determine the presence and location of detected adjacent loudspeakers relative to the self-configuring loudspeaker.

3. The loudspeaker of claim 1, wherein the data receiver comprises a wireless data receiver.

4. The loudspeaker of claim 3, wherein the processor processes the received audio data to apply a time delay and provides the processed received audio signal, where the time delay is set based upon the determined location of the self-configuring loudspeaker.

5. The loudspeaker of claim 1, wherein:
   the processor detects whether an incoming RF message is received via the RF receiver within a threshold amount of time; and
   if an incoming RF message is received within the threshold amount of time, then the processor initiates a reception sequence and processes the plurality of ultrasonic receiver signals and the received RF data and processor the received audio data, or
   if an incoming RF message is not received within the threshold amount of time, then the processor sets the location of the location aware self-configuring loudspeaker to a datum and initiates a transmission sequence.

6. The loudspeaker of claim 5, wherein, on a periodic basis, the processor detects whether an incoming RF message is received within the threshold amount of time and either initiates the reception sequence or initiates the transmission sequence.

7. A location aware self-configuring loudspeaker, comprising:
   a plurality of ultrasonic receivers that each provide an associated ultrasonic receiver signals;
   an ultrasonic transmitter that transmits an ultrasonic signal associated with the loudspeaker;
   an RF transmitter that transmits an RF signal;
   an RF receiver that receives adjacent loudspeaker RF data and provides received RF data indicative thereof;
   a data receiver that receives audio data and provides received audio data indicative thereof;
   a processor that receives and processes the plurality of ultrasonic receiver signals and the received RF data to determine a location of detected adjacent loudspeakers and the location aware self-configuring loudspeaker, to provide speaker constellation map data indicative of the determined location of the detected adjacent loudspeakers and the location of the self-configuring loudspeaker, and that receives and processes the received audio data and provides a processed received audio signal indicative of presence and the location of the location self-configuring loudspeaker relative to detected adjacent loudspeakers;
   a memory device that includes a speaker constellation map and communicates with the processor; and
   a transducer that radiates an audio signal indicative of the processed received audio data signal.

8. The loudspeaker of claim 7, wherein the plurality of ultrasonic receivers includes a first ultrasonic receiver, a second ultrasonic receiver and a third ultrasonic receiver that provide a first, second and third received ultrasonic receiver signal respectively.

9. The loudspeaker of claim 7, where the processor includes a time delay of arrival processing unit that processes the first, second and third received ultrasonic receiver signals.

10. The loudspeaker of claim 7, where the RF signal includes data indicative of a frequency value of the ultrasonic signal, and relative location of the detected adjacent loudspeaker associated with the ultrasonic signal.

11. The loudspeaker of claim 7, where the plurality of ultrasonic receiver signals comprises first, second and third received ultrasonic receiver signals and processor processes at least one of the first, second and third received ultrasonic receiver signals to determine if the loudspeaker is located inside a room, and processes the received audio data and provides the processed received audio signal based upon whether the loudspeaker is within a room or not.

12. The loudspeaker of claim 7, where the processor processes the received audio data and provides a delay to the processed received audio signal based upon location of the loudspeaker relative to detected adjacent loudspeakers.

13. The loudspeaker of claim 7, where the ultrasonic transmitter that transmits the ultrasonic signal associated with the loudspeaker is in time synchronization with the RF transmitter transmitting the RF signal from the loudspeaker.

14. The loudspeaker of claim 7, where the data receiver includes a wireless data receiver and a wireline input.

15. The loudspeaker of claim 14, where the wireless data receiver comprises at least one of a Bluetooth receiver, a Near Field Communication (NFC) receiver or a WIFI receiver.

16. The loudspeaker of claim 14, where the wireless data receiver comprises a receiver configured and arranged to receive a carrier signal in the ISM frequency range.

17. The loudspeaker of claim 7, where the processor included a digital volume control (DVC) unit that processes the received audio data and controls volume of the processed received audio signal based upon location of the loudspeaker relative to detected adjacent loudspeakers.

18. The loudspeaker of claim 7, where the processor determines which channel of multichannel audio associated with the received audio data that the loudspeaker should play based upon the determined location of the location aware self-configuring loudspeaker.

19. A method performed in a processor of a self-configuring loudspeaker of determining presence and location of adjacent loudspeakers, the method comprising:
receiving first, second and third received ultrasonic receiver signals associated with a first ultrasonic receiver, a second ultrasonic receiver and a third ultrasonic receiver respectively;
transmitting an ultrasonic signal having an ID tone associated with the self-configuring loudspeaker;
transmitting an RF signal that includes first data indicative of the ID tone and constellation map data indicative of the self-configuring loudspeaker;
receiving RF data and providing received RF data indicative thereof;
receiving audio data and providing received audio data indicative thereof;
processing the first, second and third received ultrasonic receiver signals and the received RF data to determine a location of a detected adjacent loudspeaker and a location of the self-configuring loudspeaker relative to the detected adjacent loudspeaker, and processing the received audio data and providing a processed received audio signal indicative of presence and the location of detected adjacent loudspeakers relative to the self-configuring loudspeaker; and
radiating an audio signal indicative of the processed received audio data signal.

20. The method of claim 19, where the step of processing the first, second and third received ultrasonic receiver signals and the received RF data includes time difference of arrival (TDOA) processing of the first, second and third received ultrasonic receiver signals and the received RF.

21. The method of claim 19, where the step of transmitting the ultrasonic signal having the ID tone associated with the self-configuring loudspeaker and the step of transmitting the RF signal are synchronized.

22. The method of claim 19, further comprising:
determining whether the RF data is received within a threshold amount of time; and
if the RF data is received within the threshold amount of time, then initiating a reception sequence that includes receiving the first, second, and third ultrasonic signals, and processing the first second, and third received ultrasonic signals and the received RF data, or
if the RF data is not received with the threshold amount of time, then initiating a transmission sequence that includes transmitting the ultrasonic signal having the ID tone, and transmitting the RF signal that includes the first data indicative of the ID tone and constellation map data indicative of the self-configuring loudspeaker.

23. The method of claim 22, wherein, on a periodic basis, the steps of receiving RF data, determining whether the RF data is received within a threshold amount of time, and either initiating the reception sequence or initiating the transmission sequence are repeated.

* * * * *